United States Patent [19]

Doi

[11] 4,220,003
[45] Sep. 2, 1980

[54] APPARATUS FOR GENERATING ROTATIONAL POWER

[76] Inventor: Kiyoshi Doi, No. 1341-23, Aoyama Aza-Minamiyama, Himeji-shi, Hyogo-ken, Japan

[21] Appl. No.: 25,611

[22] Filed: Mar. 30, 1979

[51] Int. Cl.² .............................................. F03G 3/00
[52] U.S. Cl. ...................................... 60/325; 60/398; 185/27
[58] Field of Search .............. 60/398, 716, 325, 374, 60/504, 505; 92/137; 290/43, 54; 185/4, 6, 27, 32; 405/75

[56] References Cited

U.S. PATENT DOCUMENTS 4,034,565   7/1977   McVeigh .......................... 60/505 X
4,075,838   2/1978   Pelin ................................. 60/398 X Primary Examiner—Edgar W. Geoghegan
Attorney, Agent, or Firm—Armstrong, Nikaido, Marmelstein & Kubovcik

[57] ABSTRACT

An apparatus comprises a pair of tanks, a pair of pistons, coupling means interconnecting the pair of pistons in balance, a closed chamber and a reservoir provided within each of the tanks and partitioned from each other by the piston, a nozzle disposed at one end of the closed chamber, a valve provided on each of the pistons, rotatable means and liquid feed channels. The nozzle, the rotatable means and the liquid feed channels are positioned substantially at the same level as or above the upper end of the reservoir in the tank to circulate the liquid. The apparatus generates rotational power with greatly reduced energy losses.

8 Claims, 12 Drawing Figures

APPARATUS FOR GENERATING ROTATIONAL POWER

BACKGROUND OF THE INVENTION

The present invention relates to an apparatus for generating rotational power, and more particularly to a novel apparatus in which a pressurized liquid is forced out from a nozzle to generate rotational power and thereafter circulated.

Conventional apparatuses for generating rotational power include those utilizing waterpower, steam engines, steam turbine engines or gas turbine engines which use a pressure gas such as steam or combustion gas, and those employing a combustion engine. Apparatus for generating rotational power with waterpower, like the hydroelectric power plant shown in FIG. 1, must be located under favorable topographical conditions which involve a large difference Hl1-Hl2 (overall head) between the water level Hl1 at the intake for drawing in water as from a river or lake R1 and the water level Hl2 at the water outlet, or a large difference H1-Hl2 (static head) between the water level H1 of a storage reservoir at the actual location of water intake and the water level Hl2 at the water outlet, so as to utilize the difference H1-H2 (total head) between the water level H1 and the water level H2 at the nozzle for driving a water wheel PW with minimized losses. The apparatus is actually equipped with a storage reservoir T, settling basin L, water intake, sluice, water channel Wl1, pressure pipelines W, water discharge channel Wl2, etc. which are disposed between the river or lake R1 for supplying water and a river R2 to which the water is discharged. Such equipment involves a head loss H3 (resulting from the bend of the pressure pipelines and friction taking place therein) which is not usable for the generation of power, so that the effective head HO is H1-H2-H3. The power given by the effective head HO and the flow rate of water used, Q, drives the water wheel PW, which rotates an unillustrated power generator G to produce electric power P. The power P is in proportion to the product of the effective head HO and the flow rate Q, multiplied by the efficiency of the water wheel PW, $\eta pw$, and further by the efficiency of the generator, $\eta g$. Thus the power P generated is given by Equation (1) below.

$$P = 9.8 Q H O \eta p w \eta g \quad (1)$$

where
P = electric power (kW)
Q = flow rate (m³/sec)
HO = effective heat (m)
$\eta pw$ = efficiency of water wheel
$\eta g$ = efficiency of generator Such an apparatus for generating rotational power with waterpower involves marked seasonal variations in the flow rate of water available, which must be compensated for by a dam or like large-scale equipment in addition to various installations mentioned above. Further the apparatus utilizing a pressure gas or internal combustion engine for the generation of rotational power need usual fuel or atomic fuel which gives off a toxic gas on combustion to cause air pollution or which is likely to release a radioactive substance or radiation and cause water or air pollution. For fear of the possible environmental pollution, residents may act against the installation of the apparatus. Thus the apparatus heretofore known have various drawbacks.

OBJECTS OF THE INVENTION

An object of the present invention is to provide an apparatus which is capable of generating rotational power with reduced energy losses and which can be installed at any location without necessitating the large-scale equipment such as dam conventionally needed.

Another object of the invention is to provide an apparatus for generating rotational power with safety without causing environmental pollution.

Another object of the invention is to provide a rotational power generating apparatus which can be installed at a site of limited space with use of underground tanks or utilizing a space above the ground.

Another object of the invention is to provide a rotational power generating apparatus which can be built on any of small to large scales at a lower cost than conventional apparatus utilizing waterpower or thermal power.

Another object of the invention is to provide a rotational power generating apparatus in which a liquid filling a tank is adapted to be circulated therethrough so that the liquid will not be consumed except by evaporation.

Still another object of the invention is to provide a rotational power generating apparatus which incorporates a liquid discharge nozzle in combination with an air discharge nozzle to produce a jet of liquid and air in mixture.

Other objects of the invention will become apparent from the following description with reference to the accompanying drawings.

DETAILED DESCRIPTION

Figure 1:
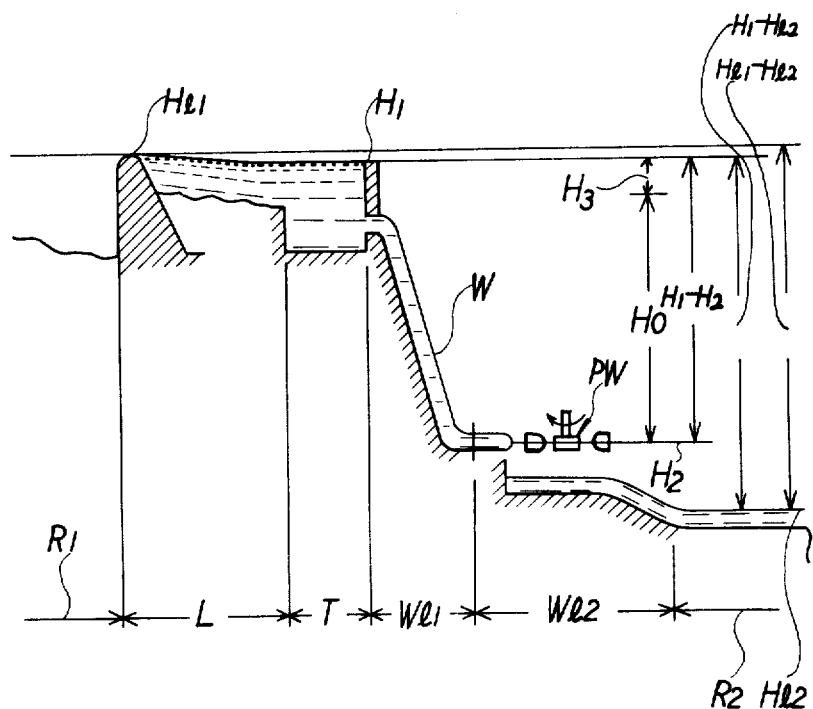
FIG. 1 is a sectional diagram schematically showing a conventional rotational power generating apparatus (hydroelectric power plant)
Figure 2:
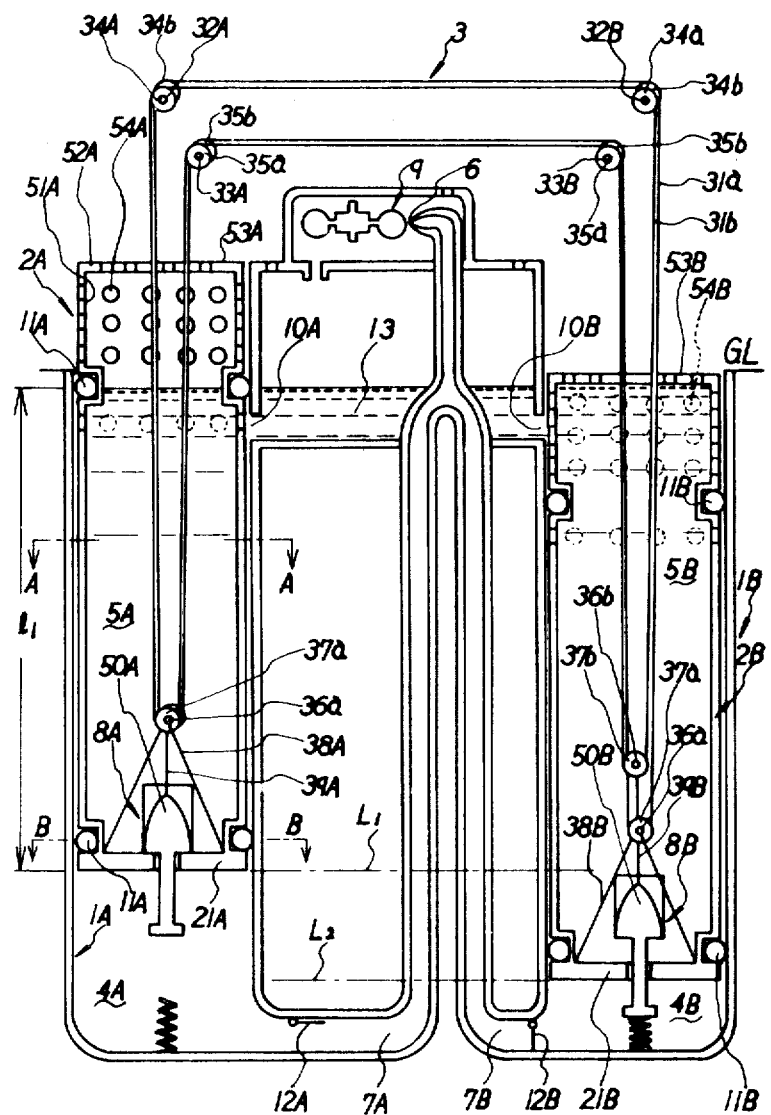
FIG. 2 is a sectional view schematically showing a rotational power generating apparatus embodying the present invention.
Figure 12:
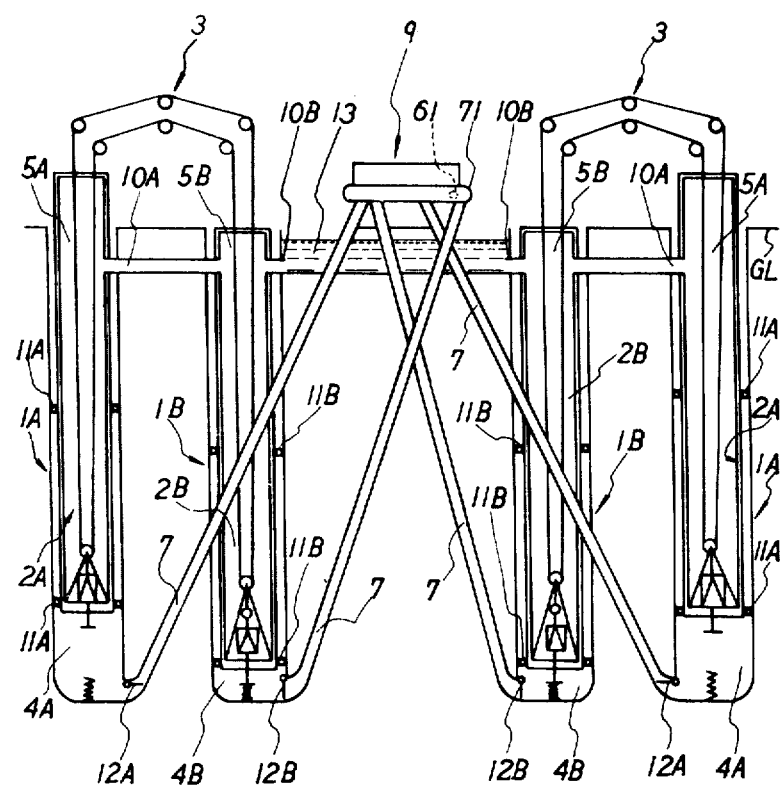
FIG. 12 is a view in section taken along the line C—C in FIG. 10.

With reference to FIGS. 2 and 12, a pair of tanks 1A, 1B have the same cylindrical shape (identical in height and diameter) and house a pair of pistons 2A, 2B respectively which are alternately slidable upward and downward reciprocally between an upper limit position L1 and a lower limit position L2. These positions are suitably settable. The pistons 2A, 2B are interconnected in balance by coupling means 3 so that when one of the pistons 2A, 2B descends or ascends, the other piston ascends or descends. These tanks 1A, 1B include closed chambers 4A, 4B formed under the pistons 2A, 2B and filled with a liquid such as water, seawater, or the like. The tanks 1A, 1B further include reservoirs 5A, 5B provided in an upper portion of the pistons 2A, 2B for storing the liquid. The closed chambers 4A, 4B are in communication with pressure pipes 7A, 7B which are joined together and provided with a nozzle 6 at one end of the joined portion. (In FIG. 12, the nozzle is indicated at 61, and the pressure pipes are designated at 7.) The pistons 2A, 2B are provided with valves 8A, 8B which close when the pistons lower from the upper position L1 to the lower position L2 to confine and pressurize the liquid within the closed chambers 4A, 4B, rendering the liquid serviceable as a pressure liquid. When the pistons 2A, 2B rise from the lower position L2 to the upper position L1, the valves 8A, 8B open to pass the liquid from the reservoirs 5A, 5B into the closed chambers 4A, 4B. The pressure liquid, when forced out from the nozzle 6, drives rotatable means (water wheel) 9 to generate rotational power. After driving the water wheel 9, the discharged liquid returns to the reservoirs 5A, 5B through liquid feed channels (feed pipes) 10A, 10B. Indicated at 13 is a basin for collecting the discharged liquid. The pistons 2A, 2B are provided with annular packings 11A, 11B for confining the liquid within the closed chambers 4A, 4B as shut off by partitions 21A, 21B of the pistons 2A, 2B when the liquid is subjected to pressure by the gravity acting on the liquid within the reservoirs 5A, 5B, on the reservoirs themselves and on weights 50A, 50B. The nozzle 6, the water wheel 9 and liquid feed pipes 10A, 10B are disposed above the upper ends of the reservoirs 5A, 5B to permit the return of the liquid. The coupling means 3 comprises a wire 31a for the pistons 2A, 2B, a wire 31b for the weights 50A, 50B, fixed pulleys 34a, 35a provided for the pistons and rotatable on shafts 32A, 32B, 33A, 33B fixedly supported above the ground, fixed pulleys 34b, 35b for the weights 50A, 50B, pulleys 37a provided for the pistons 2A, 2B and rotatable on shafts 36a reciprocally movable upward and downward on the center axes of the tanks 1A, 1B, and pulleys 37b provided for the weights 50A, 50B and rotatable on shafts 36b which are similarly movable. Wires 38A, 38B are fastened, each at one end, to the shafts 36a for the movable pulleys 37a and are also fastened, each at the other end, to the partitions 21A, 21B on the pistons 2A, 2B. Wires 39A, 39B are fastened, each at one end, to the shafts 36b and are also fastened, each at the other end, to the weights 50A, 50B to suspend the weights which serve to add to the weight of the reservoirs 5A, 5B of the pistons 2A, 2B. A suitable number of weights, such as those indicated at 50A, 50B, may be mounted on the partitions 21A, 21B of the pistons 2A, 2B. Preferably the weights may be shaped for example in a conical or spindle-like form so as to be less resistant to water when rising, while they must be mounted on the partitions 21A, 21B with good stability. The center of gravity of the weight 50A (50B) and the piston 2A (2B) are in alignment with the axis of the cylindrical tank 1A (1B). The height of the peripheral walls 51A, 51B forming the reservoirs 5A, 5B of the pistons 2A, 2B, which can be determined as desired, is such that the ground surface GL is flush with the upper ends 53A, 53B of the reservoirs 5A, 5B of the tanks 1A, 1B when the pistons 2A, 2B are in the lower position L2. To keep the interior of the tanks 1A, 1B in communication with the atmosphere, the top portions of the peripheral walls 51A, 51B or the top plates 52A, 52B are formed with a large number of small apertures 54A, 54B, or the peripheral walls 51A, 51B may be formed from a tough metal net. To effectively utilize a site of limited area, the tanks 1A, 1B may be installed as predominantly placed underground or, otherwise, as positioned above the ground. The tanks 1A, 1B may be embedded in the ground with the upper ends 53A, 53B positioned flush with the ground surface GL and also with the peripheries of the tanks 1A, 1B rigidly fixed in place as with reinforced concrete. The weight 50A on the piston 2A must have the same shape and mass as the weight 50B on the piston 2B so as to be in balance with the weight 50B, whereby the energy needed for raising the weights by the coupling means 3 can be minimized with reduced energy losses. Shutoff valves 12A, 12B are opened when the liquid pressure in the closed chambers 4A, 4B is high to pass the pressure liquid in the chambers 4A, 4B through the pressure pipes 7A, 7B to the nozzle 6, while the valves are closed when the liquid pressure in the closed chambers 4A, 4B is low, preventing the supply of the liquid from the chambers 4A, 4B to the nozzle 6 through the pressure pipes 7A, 7B, The ratio in capacity of the closed chambers 4A, 4B to the reservoirs 5A, 5B varies with the rate or pressure at which the liquid is forced out from the nozzle 6. Preferably the capacity of the reservoirs 5A, 5B is 80% of the combined capacity of the closed chambers 4A, 4B and the reservoirs 5A, 5B, and that of the closed chambers 4A, 4B is 20% of the combined capacity. Since the pressure to which the liquid within the closed chambers 4A, 4B is subjected with the use of the potential energy of the liquid within the reservors 5A, 5B increases with the length l1 of the reservoirs 5A, 5B from the level of the liquid therein to the partitions 21A, 21B, it is preferable that the length l1 is 80 to 90% of the entire length of the tanks.

With reference to FIG. 2, when one piston 2A is moved down from the upper position L1 to the lower position L2, the valve 8A is closed, causing the pressure liquid within the closed chamber 4A to jet out from the nozzle 6 by way of the pressure pipe 7A to drive the water wheel 9 and produce rotational power, while permitting the other piston 2B to rise from the lower position L2 to the upper position L1 with the valve 8B opened to allow the liquid within the reservoir 5B to flow into the closed chamber 4B.

Subsequently when the other piston 2B descends from the upper position L1 to the lower position L2, the valve 8B is closed to cause the pressure liquid within the closed chamber 4B to jet out from the nozzle 6 via the pressure pipe 7B and drive the water wheel 9 for the generation of rotational power. At this time, the piston 2A is raised from the lower position L2 to the upper position L1 and the valve 8A is opened, allowing the liquid within the reservoir 5A to flow into the closed chamber 4A.

This cycle is repeated a number of times with the sliding reciprocation of the pistons 2A, 2B within the tanks 1A, 1B, whereby the water wheel 9 is driven to continuously produce rotational power. The liquid forced out against the wheel 9 circulates without any loss except by evaporation.

When electric power P is generated by a dynamo driven by the water wheel 9, the power P is given by Equation (1) above in which a valve 1O is substituted for the effective head HO, 1O being the sum of the length l1 of the reservoirs 4A, 4B from the water level therein to the partitions 21A, 21B and a value l2 (not shown) and calculated in terms of head from the weights of the balances 50A, 50B on the partitions 21A, 21B.

It is further assumed that m is the mechanical loss resulting from the reciprocation of the pistons 2A, 2B, weights 50A, 50B and coupling means 3 and that k is the energy needed for raising the pistons 2A, 2B and weights 50A, 50B. The electric power P obtained is then expressed by Equation (2) below.

$$P = 9.8 Q H O \eta p w \eta g - m - k \quad (2)$$

An external force may be given to the coupling means 3 (as by driving the pulleys 34a, 34b, etc. with a motor in a specified direction) to compensate for the energy loss m+k, namely the mechanical loss m plus the energy required for raising the pistons 2A, 2B, weights 50A, 50B, etc. With such an external force given, the power P is expressed by Equation (2) from which the energy loss, m+k, is eliminated. The external force, when applied, results in an increase in the total weight of the liquid circulating per unit time, enables the water wheel 9 to produce increased rotational output P per unit time and ensures the circulation of the liquid with stability and, hence is advantageous.

With reference to FIGS. 3 to 7, a tough support post 82 of predetermined length extends from the center of the bottom of the weight 50 through a center opening 22 of the partition 21 of the piston 2 to project from the lower side of the partition 21. Immediately before the partition 21 reaches the lower position L2 during its downward movement, the support post 82 approaches the bottom plate of the tank 1 and strikes a spring 15 on the bottom plate, whereupon the post 82 is thereby forced to thrust the weight 50 upward, thus stopping the upward movement of the other weight 50 connected to the above-mentioned weight 50 by the coupling means 3. The partition 21, which can be of any desired shape, may preferably have projections so as to be suitable for applying pressure to the liquid within the closed chamber 4 beneath the partition 21. For example, the partition 21 may be provided, on the pressure applying under side thereof, with annular projections 23 having an approximately triangular cross section and disposed in a double or triple arrangement in accordance with the size of the partition 21.

Figure 3:
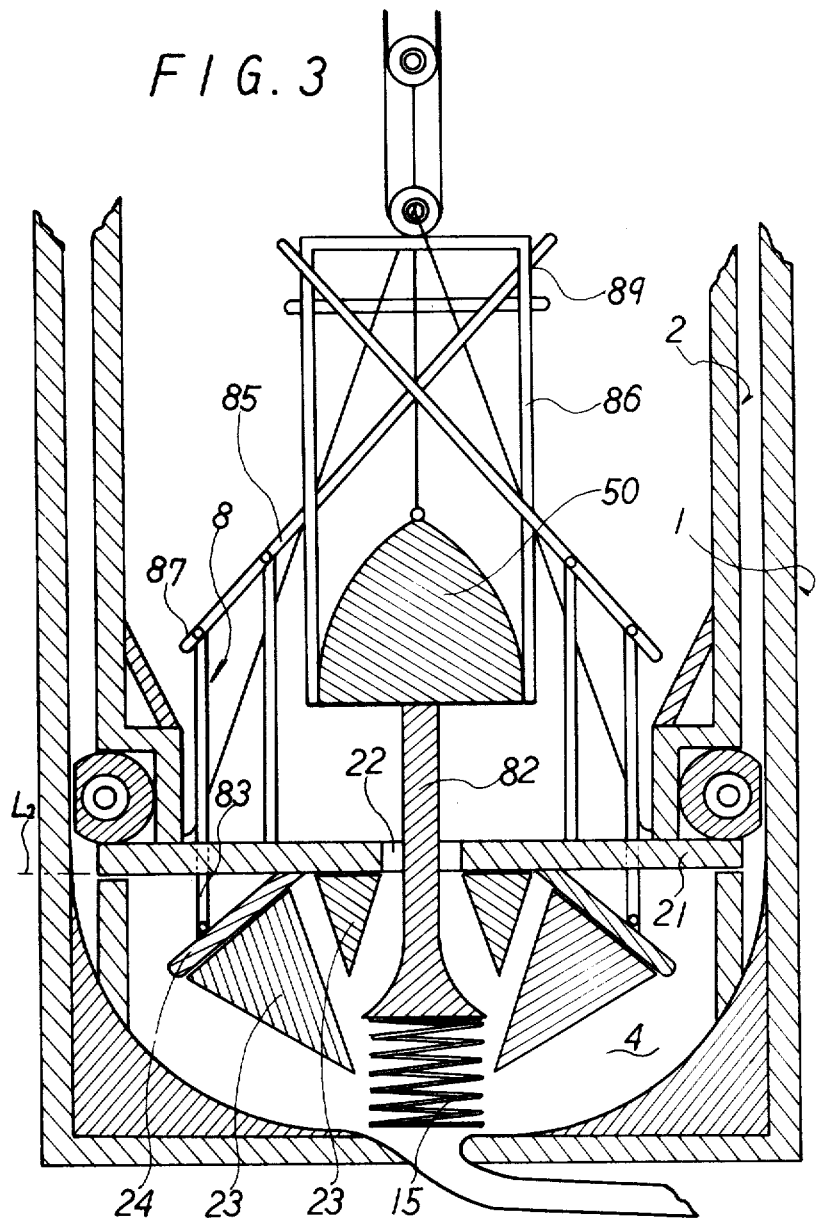
FIG. 3 is a fragmentary view in section of a piston shown in FIG. 2 when it starts to rise.
Figure 4:
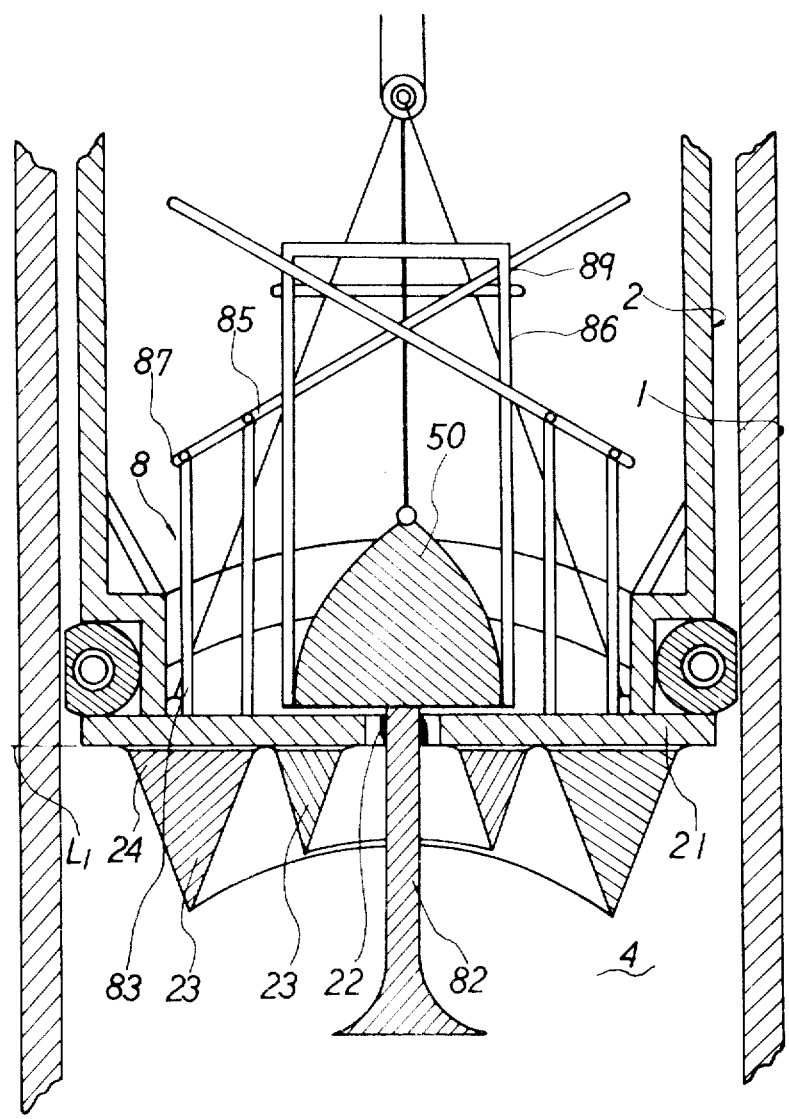
FIG. 4 is a fragmentary view in section of the piston shown in FIG. 2 when it starts downward movement.
Figure 5:
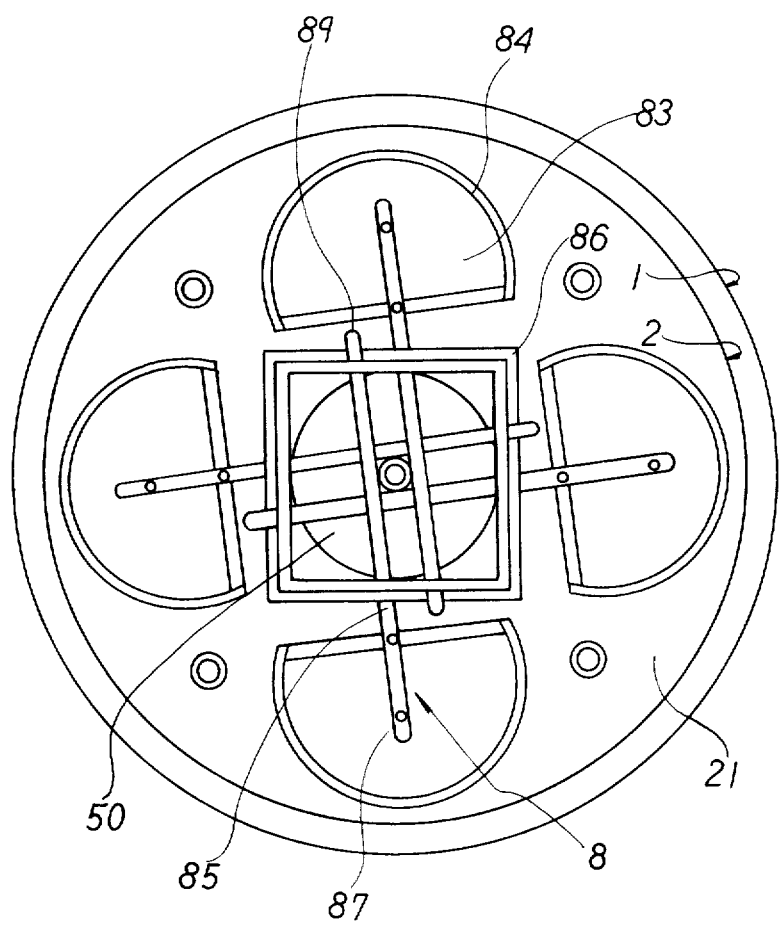
FIG. 5 is a view in section taken along the line A—A in FIG. 2.

With reference to FIGS. 3 to 5, the annular projection 23 is partly cut and made openable as at 24 to provide shutoff valves 83 serving as the valve means 8. The valves 83 are provided for a plurality of flow apertures 84 formed in the partition 21. Each of the shutoff valves 83 is connected to a lever 85 having an upper portion 89 abutting against the upper end of a frame 86 to which the weight 50 is attached. The valve 83 connected to the lower end 87 of the lever 85 opens when the weight 50 moves up and closes when the weight 50 lowers during its upward and downward reciprocation.

Figure 6:
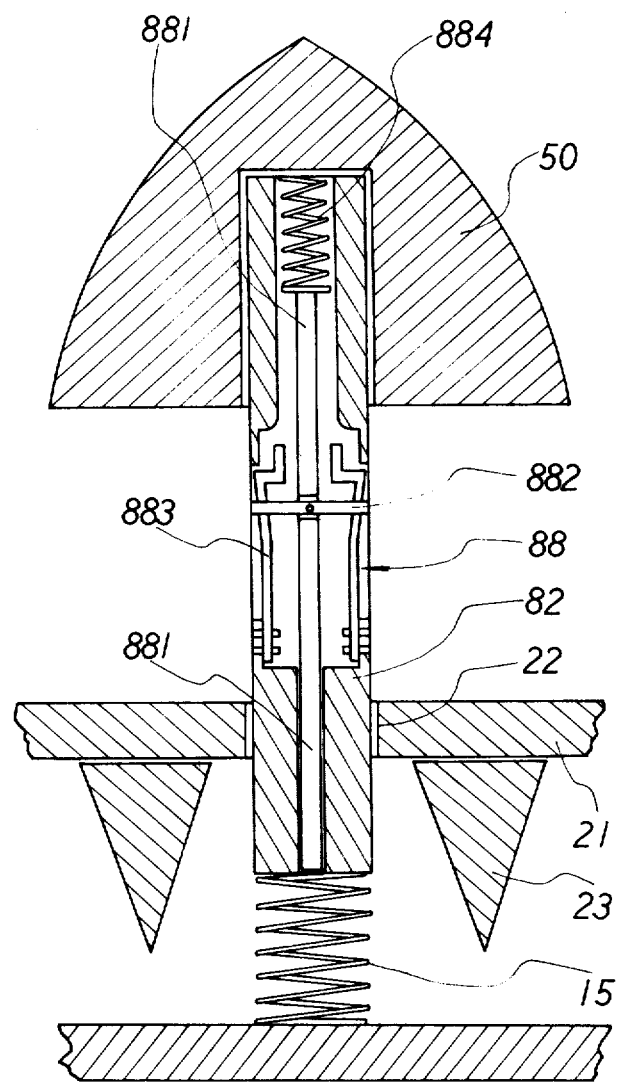
FIG. 6 is a fragmentary view in section showing the central support post in FIG. 3.
Figure 7:
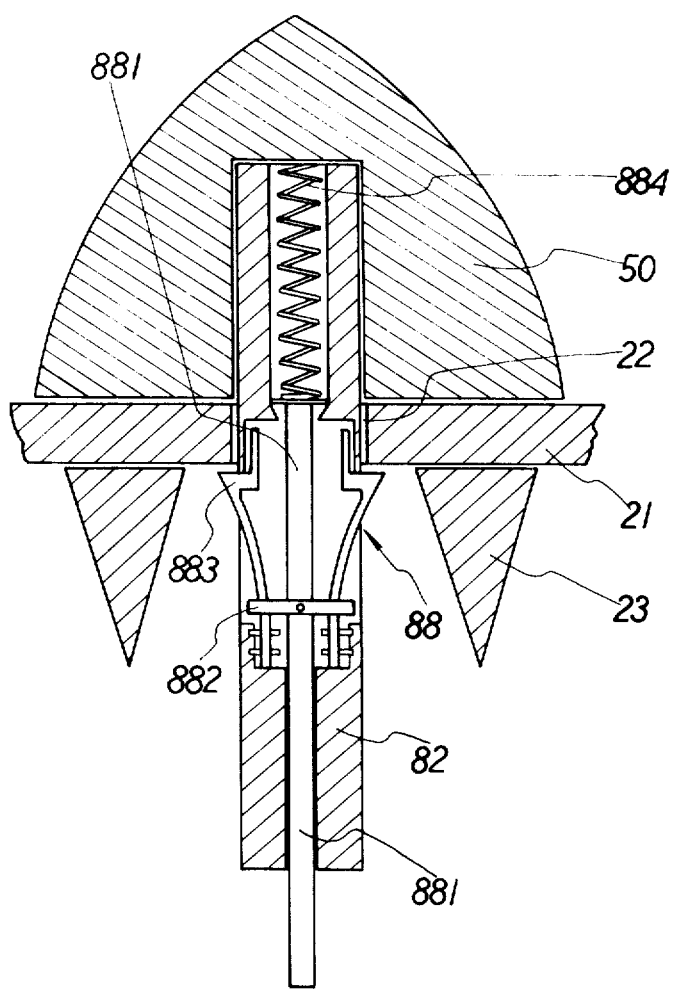
FIG. 7 is a fragmentary view in section showing the central support post in FIG. 4.

With reference to FIGS. 6 and 7, the support post 82 is provided with a movable valve 88 comprising a center stem 881, an arm 882 attached to the center stem, leaf springs 883 attached to the post 82 and a coil spring 884 housed in the upper end of the post 82. As seen in FIG. 6, the leaf springs 883 of the movable valve 88 are accommodated inside the outer periphery of the post 82 so as to be freely movable through the opening 22 of the partition 21 when the piston 2 rises. When brought under the partition 22 with the downward movement of the piston, the leaf springs 883 open outward beyond the outer periphery of the post 82 to hold the weight 50 in intimate tight contact with the partition 21.

Figure 8:
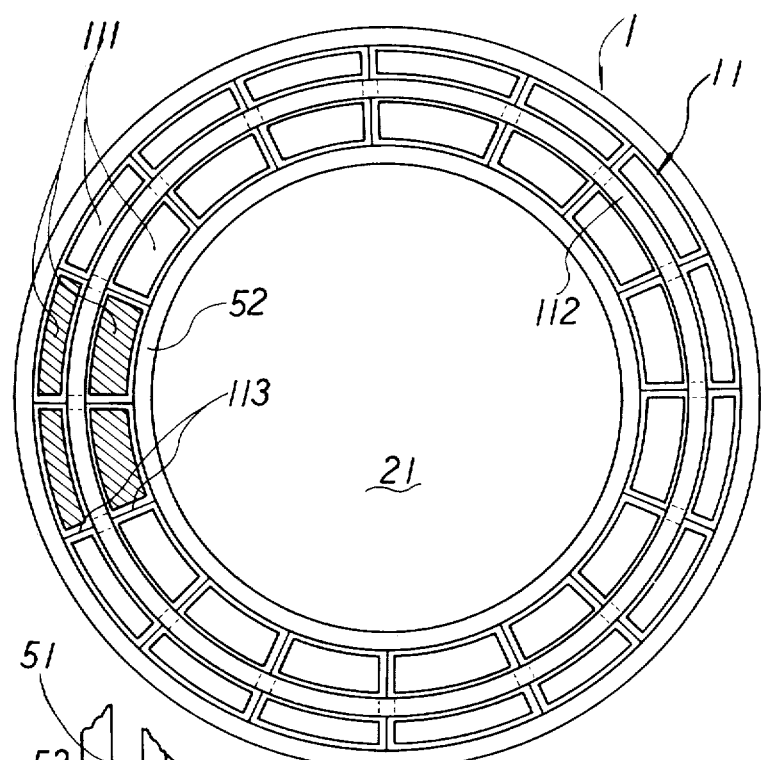
FIG. 8 is a view in section taken along the line B—B in FIG. 2.
Figure 9:
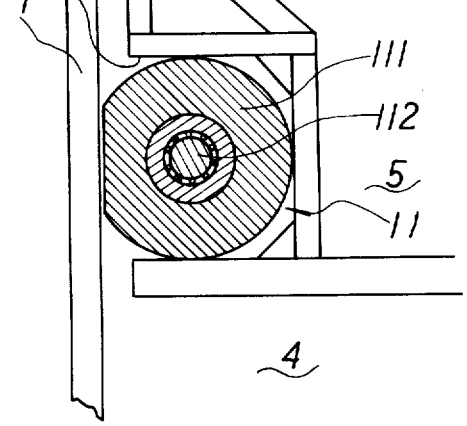
FIG. 9 is a sectional view showing the annular packing in FIG. 2.

With reference to FIGS. 8 and 9 showing the tank 1, piston 2, partition 21 and annular packing 11, the annular packing 11 comprises roller packing members 111 substantially circular in cross section and having the desired weight, thickness and length. Each of the packing members 111 comprises a center portion made of corrosion resistant metal or rigid plastics, having a desired number of bearings fitted in its inner periphery and covered over the outer periphery with tough, flexible, elastic material such as rubber, plastics, sponge or the like. The roller packing members 111 are fitted in a channel-shaped annular groove 52 formed in the peripheral wall 51 of the reservoir 5 to render the piston 2 smoothly movable upward and downward in reciprocation with reduced friction between the inner surface of the tank 1 and the outer surface of the piston 2. In accordance with the size of the partition 21, a suitable number of roller packing members 111 are mounted rotatably on the center shaft 112 of the packing 11 as disposed within the annular groove 52. Thin smooth-surfaced plates 113 having antistatic and anticorrosive properties are interposed between the opposed ends of the roller packing members 111.

The annular packing 11 shown in FIGS. 8 and 9 has the advantage that it renders the piston 2 smoothly slidable within the tank 1 with reduced friction while sealing off the closed chamber 4 to prevent the liquid from jetting out therefrom over the partition 21.

Figure 10:
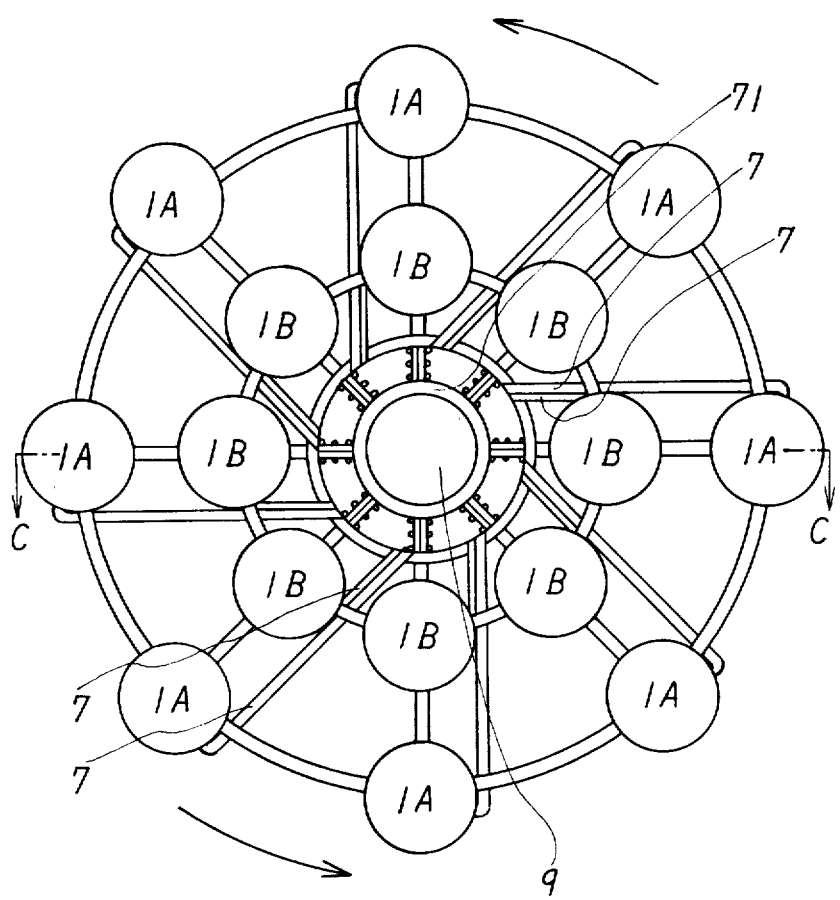
FIG. 10 is a sectional view schematically showing another embodiment of the invention.
Figure 11:
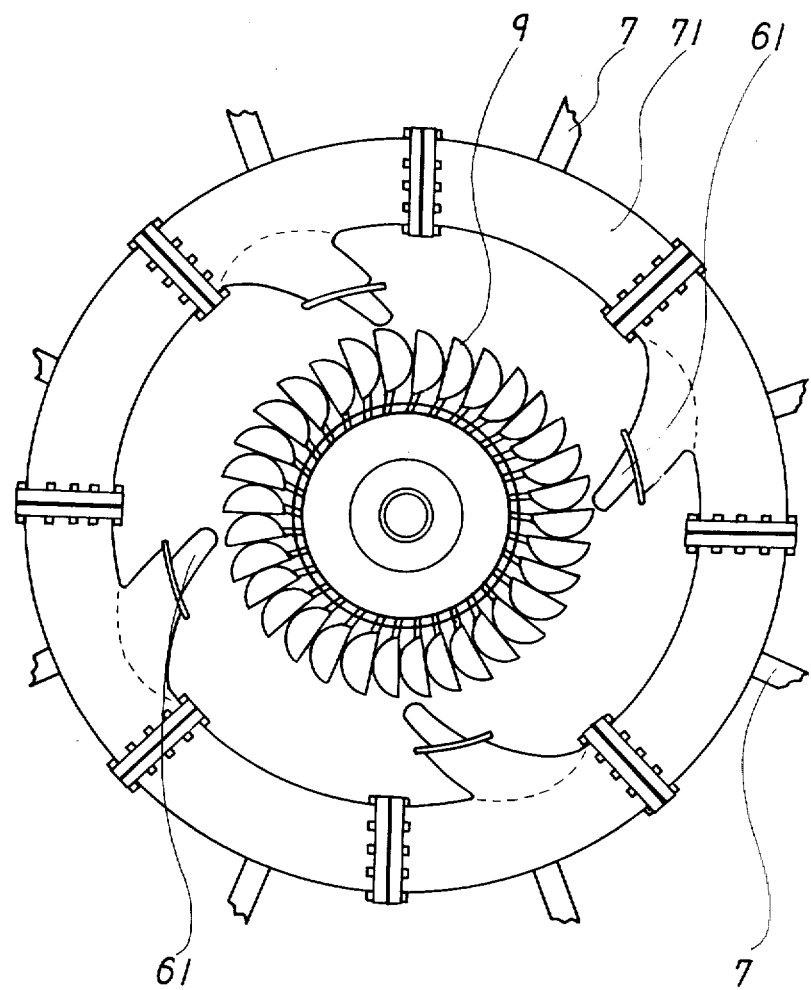
FIG. 11 is a plan view showing the rotatable means (water wheel) in FIG. 10.

FIGS. 10 to 12 show pairs of the tanks 1A, 1B, pressure tubes 7 each having one end communicating with the closed chamber of the tank, a center header 71 connecting together the other ends of the pressure pipes 7, nozzles 61 provided on the inner periphery of the header 71 and a water wheel 9.

With the arrangement shown in FIGS. 10 to 12 in which many pairs of the tanks 1A, 1B are arranged radially, the pressure fluid collected at the center header 71 can be concentrically forced out from the nozzles 61 against the single water wheel 9 so as to obtain the desired amount of rotational energy. This arrangement is advantageous in that rotational energy is available with reduced fluctuations.

The embodiments shown in FIGS. 2 to 12 may be provided with an air tank, air pump, air compressor and the like for an air discharge nozzle which is provided conjointly with the liquid discharge nozzle to force out a liquid and air in mixture.

Although the rotational power generating apparatus of the present invention has been described above with reference to specific embodiments, the invention is not limited to the embodiments disclosed and other changes and modifications may be made by one skilled in the art without departing from the spirit of the invention as set forth in the claims which follow.

What is claimed is:

1. An apparatus for generating rotational power comprising a pair of tanks, a pair of pistons provided in the tanks respectively and reciprocally slidingly movable between an upper limit position and a lower limit position alternately upward and downward, coupling means interconnecting the pair of pistons in balance for causing one of the pistons to move downward or upward while permitting the other piston to move upward or downward, a closed chamber formed under the piston in each of the tanks and filled with a liquid, a reservoir provided in an upper portion of the piston within each of the tanks for storing the liquid, a nozzle provided at one end of the closed chamber, valve means closable when each of the pistons moves downward from the upper limit position to the lower limit position to confine and pressurize the liquid within the closed chamber and render the liquid serviceable as a pressure liquid, the valve means being openable when each of the pistons moves upward from the lower limit position to the upper limit position to pass the liquid in the reservoir into the closed chamber, means rotatable by a jet of the pressure liquid discharged from the nozzle to generate rotational power, and a liquid feed channel for returning the discharged liquid to the reservoir after the liquid has rotated the rotatable means for the generation of rotational power, the nozzle, the rotatable means and the liquid feed channel being positioned substantially at the same level as or above the upper end of the reservoir to circulate the liquid.

2. The apparatus of claim 1, wherein the tanks are cylindrical.

3. The apparatus of claim 2, wherein the tanks are embedded in the ground with the upper ends of the tanks positioned flush with the ground surface.

4. The apparatus of claim 2, wherein the upper end of a tank is flush with the upper end of a piston when the piston is in the lower limit position.

5. The apparatus of claim 1, wherein a weight is provided in the reservoir.

6. The apparatus of claim 1, wherein the coupling means comprises pulleys rotatably mounted on shafts attached to the pistons, fixed pulleys rotatably mounted on shafts fixed in position and wires reeved around the pulleys.

7. The apparatus of claim 1, wherein the liquid is water.

8. The apparatus of claim 1, wherein the rotatable means is a water wheel.

* * * * *